(12) United States Patent
Wu et al.

(10) Patent No.: US 9,600,933 B2
(45) Date of Patent: Mar. 21, 2017

(54) MOBILE AUGMENTED REALITY SYSTEM

(75) Inventors: Yi Wu, San Jose, CA (US); Gabriel Takacs, Santa Clara, CA (US); Maha El Choubassi, San Jose, CA (US); Igor V. Kozintsev, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1093 days.

(21) Appl. No.: 13/175,608

(22) Filed: Jul. 1, 2011

(65) Prior Publication Data
US 2013/0002649 A1 Jan. 3, 2013

(51) Int. Cl.
G09G 5/00 (2006.01)
G06T 19/00 (2011.01)

(52) U.S. Cl.
CPC .................. G06T 19/006 (2013.01)

(58) Field of Classification Search
USPC ......................................... 345/633
See application file for complete search history.

(56) References Cited

U.S. PATENT DOCUMENTS

| 7,098,435 B2 * | 8/2006 | Mueller et al. ............ 250/208.1 |
| 2007/0031064 A1 * | 2/2007 | Zhao et al. .................... 382/285 |
| 2008/0316203 A1 | 12/2008 | Sandor et al. |
| 2009/0005068 A1 * | 1/2009 | Forstall et al. ............ 455/456.1 |
| 2010/0027888 A1 * | 2/2010 | Katano ................. G06T 19/006 382/173 |
| 2010/0045700 A1 * | 2/2010 | Lefevre et al. .............. 345/633 |
| 2010/0325563 A1 | 12/2010 | Goldthwaite et al. |
| 2011/0148922 A1 | 6/2011 | Son et al. |
| 2011/0274343 A1 * | 11/2011 | Krishnaswamy et al. .... 382/154 |
| 2011/0279445 A1 * | 11/2011 | Murphy et al. .............. 345/419 |
| 2011/0310227 A1 * | 12/2011 | Konertz et al. .................. 348/46 |
| 2012/0086727 A1 * | 4/2012 | Korah .................. G06T 19/006 345/633 |

FOREIGN PATENT DOCUMENTS

| EP | 0949513 | 10/1999 |
| JP | 2003-079937 | 3/2003 |

(Continued)

OTHER PUBLICATIONS

"PCT, International Search Report and Written Opinion of the International Searching Authority for International Application No. PCT/US2012/045205", (Nov. 28, 2012), Whole Document.

(Continued)

*Primary Examiner* — David H Chu
(74) *Attorney, Agent, or Firm* — Blakely, Sokoloff, Taylor & Zafman LLP

(57) ABSTRACT

Embodiments of the invention relate to systems, apparatuses and methods to provide image data, augmented with related data, to be displayed on a mobile computing device. Embodiments of the invention display a live view augmented with information identifying an object amongst other objects. Embodiments of the invention may utilize other related data, such as 3D point cloud data, image data and location data related to the object, to obtain a specific location of an object within the live view. Embodiments of the invention may further display a live view with augmented data three-dimensionally consistent with the position and orientation of the image sensor of the mobile computing device.

26 Claims, 8 Drawing Sheets

(56) References Cited

FOREIGN PATENT DOCUMENTS

| | | |
|---|---|---|
| JP | 2007136133 | 6/2007 |
| JP | 2009-038451 | 2/2009 |
| JP | 2010-049690 | 3/2010 |
| JP | 2011-113127 | 6/2011 |
| KR | 100985737 | 10/2010 |

OTHER PUBLICATIONS

JP Office Action, Application No. 2014-519221, 6 pages, Feb. 3, 2015.
JP Office Action, Application No. JP2014-519221, Dec. 27, 2015, 6 pages.
EP Search Report, EP12807935.7, Nov. 19, 2015.

\* cited by examiner

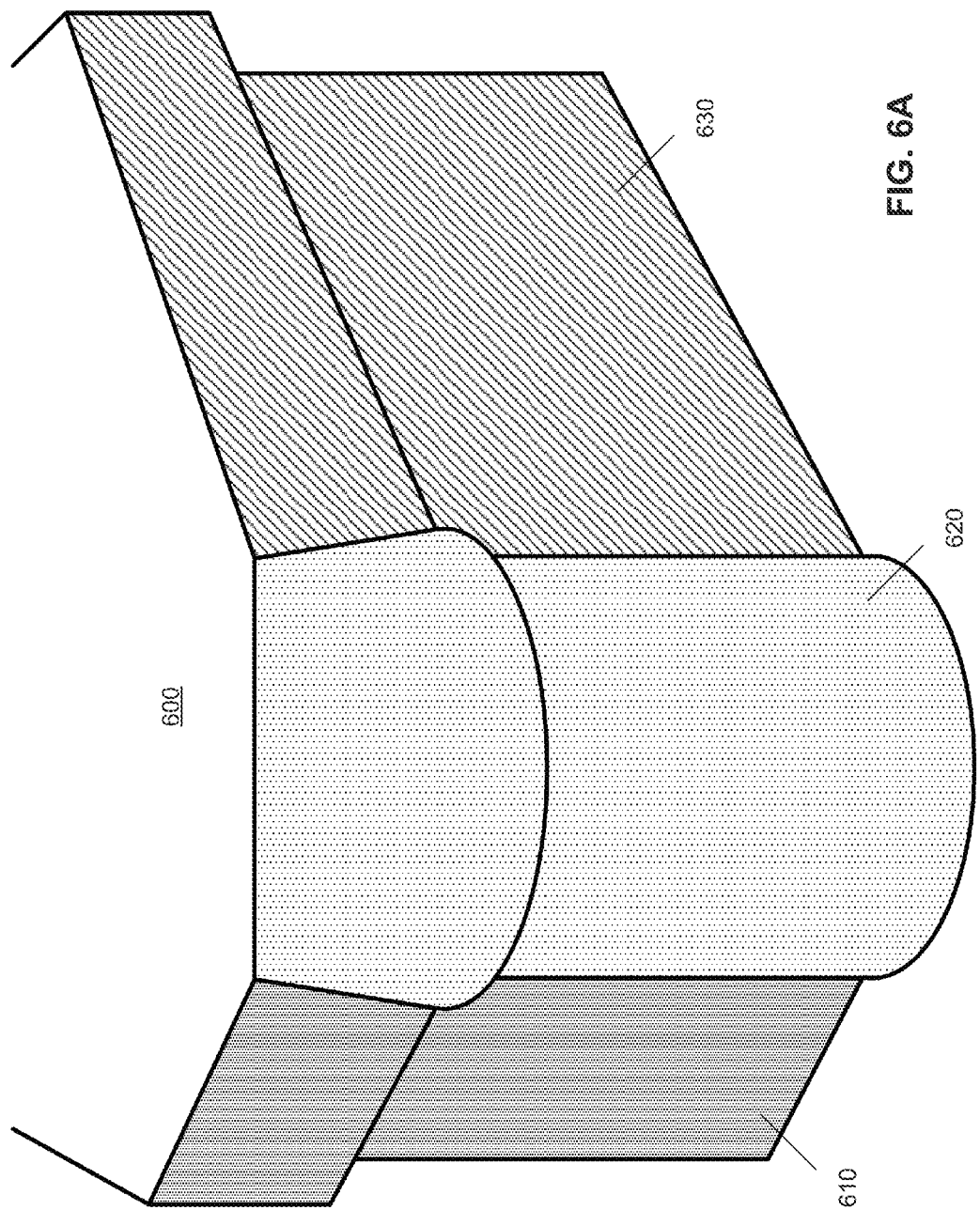

MOBILE AUGMENTED REALITY SYSTEM

FIELD

Embodiments of the invention generally pertain to mobile computing devices and more specifically to augmenting live views captured by image devices with related content.

BACKGROUND

Mobile computing devices typically include cameras, location and orientation sensors, and increasingly powerful computational resources. Mobile computing devices are also able to establish high bandwidth connections to utilize cloud computing infrastructures and service providers.

Displays included in mobile computing devices may be used as a live viewfinder, allowing device users to capture real-time image data (e.g., pictures, videos); however, most applications fail to utilize the computational resources available to the mobile computing device to provide users with additional information relevant to the subject matter within the live view displayed (i.e., the viewfinder). The limited number of applications that do attempt to enhance the live view are limited to displaying basic information such as the distance between the user and a general location, or basic information about the user's surroundings (e.g., types of businesses within the live view) that is imprecise with respect to the user's position and with respect to the representation of the user's surroundings captured in the live view.

For example, if a user would like to identify a specific business location within a captured live view, but said business is located in a building with several other businesses, current solutions may augment the live view with data identifying the building, but are incapable of conveying more precise information about the business's location.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIGS. 6A and 6B illustrate projection masks and an augmented live view for multiple points of interest according to an embodiment of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention relate to systems, apparatuses and methods to provide image data, augmented with related data, to be displayed on a mobile computing device. While current solutions process 3D data to perform limited real-time object recognition, such information may be insufficient to convey useful information to a user. For example, if a user would like to identify a specific business location within a captured live view, and said business is located in a building with several other businesses, processing 3D point cloud data alone would not generate information sufficient to tell the user where the business location is; in other words, current solutions may augment a live view with data identifying a building, but current solutions are incapable of conveying more precise information about a business location in the scenario described above.

Embodiments of the invention address the above described limitations by augmenting a live view with information identifying an object amongst other objects within 3D point cloud data—e.g., finding the extent of a storefront (or storefronts) that are included in a common building façade. Embodiments of the invention may utilize other related data, such as image data and location data related to the object, to obtain a specific location of an object within the live view.

Embodiments of the invention may further display a live view with augmented data three-dimensionally consistent with the position and orientation of the image sensor of the mobile computing device. Embodiments of the invention may determine the alignment of the live view by processing the live view image data and pre-existing 3D image data. The determination of the position and orientation of the image sensor may further be based on sensor data from other sensors of the host mobile computing device.

Example scenarios described below focus on points of interest within buildings that include multiple businesses or storefronts. It is to be understood that embodiments of the invention may be used for any point of interest that is included in an object but not distinguishable from 3D point cloud data alone, e.g., an object defined by a set of contours included in a wall, a section of books included in a bookcase, a particular feature of a sculpture, etc.

Figure 1:
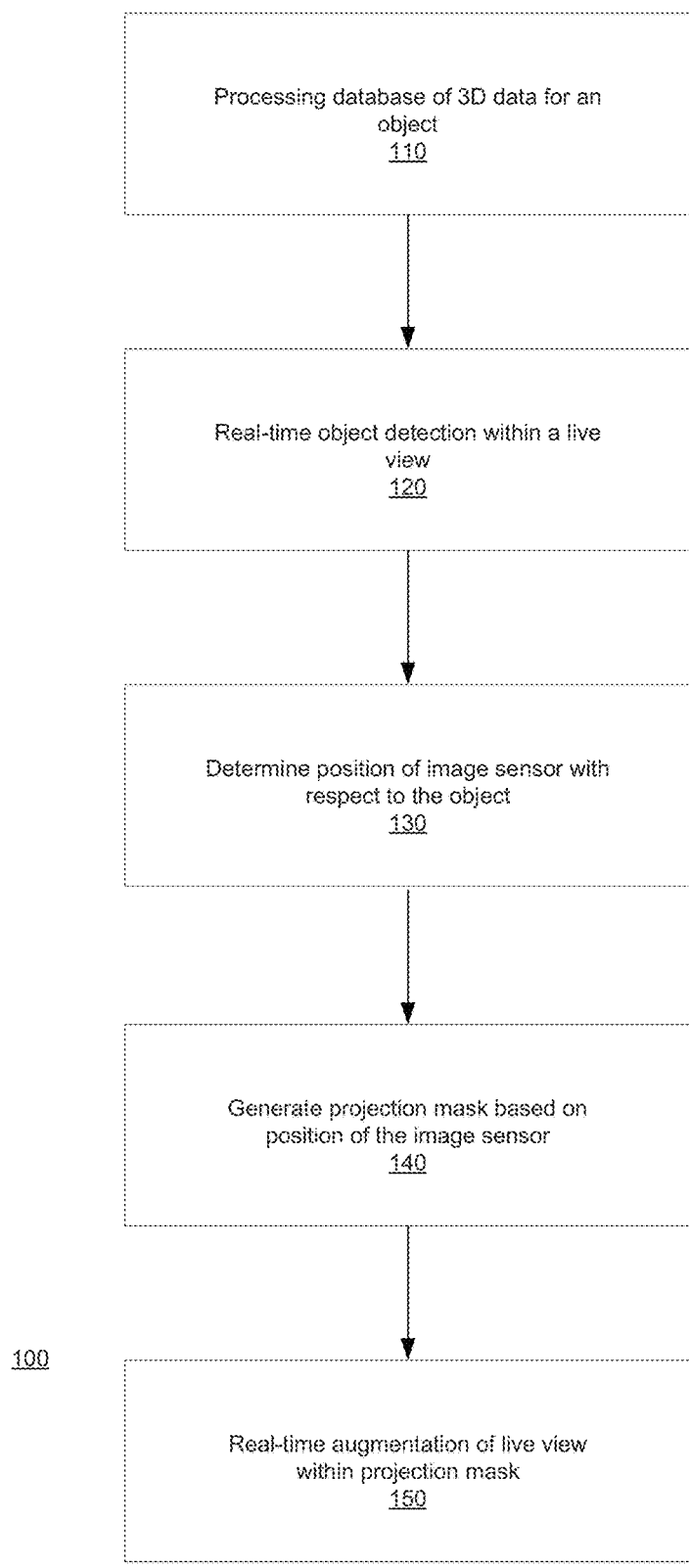
FIG. 1 is a flow diagram of an embodiment of the invention.

FIG. 1 is a flow diagram of an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

In process flow 100, a database of 3D cloud data for an object is processed, 110. Said database may include 3D point cloud data obtained by lidar, stereo imaging, structured light, time-of-flight cameras, or any other technology used as inputs for generating 3D models of objects. It is to be understood that a 3D model of an object will include multiple segments representing various contours of the object. For example, a 3D model of an object having a simple cube shape will include an arrangement of plurality of 2D planes, while objects having more complex surface variations may have an arrangement of both 2D planes and 3D segments.

Thus, processing 3D data of an object may include extracting object segments (e.g., 2D planes), combining sets of point cloud data, associating point cloud data with location data (described below) and noise removal. Said processing 3D data may be performed in different orders via different processes.

In some embodiments, processing said 3D data may further include processing pre-stored multiple 2D images of an object or scene from various view angles along with corresponding 3D point cloud data sets from different view angles and view positions. These point cloud data sets may overlap. To identify the overlapping regions, the sets of point cloud data may be restricted to a local neighborhood, and related point cloud information may be merged.

In one embodiment, 3D point cloud data sets are modeled as a set of noisy measurements (the sources of noise may include uncertainty of the point of measurement, its orientation, sensor noise, etc) of the actual 3D points. An estimate of the noise statistics and the original set of 3D points in the overlapping regions may then be obtained. These noise statistics may be utilized to obtain better estimates of the 3D points for all point cloud data sets in order to extract projection masks, which will be utilized as described below. It is to be understood that the 3D points in the region of overlap have the most accurate estimates, and thus these points may be given priority in estimating the projection masks to which they belong (for example weighted least squares may be used for an estimation of the projection mask parameters with more weights assigned to these points).

In one embodiment, confidence/reliability information associated with 3D point cloud data is received. This additional information may be leveraged with the 3D point cloud data to infer the reliability for 3D points' measurements. In one embodiment, color information may be used to more accurately identify objects from 3D point cloud data. For example, 3D points that are within the same plane, are close in pixel distance, and have similar colors (i.e., correspond to the same colored pixels in pre-stored images) will tend to be assigned to the same potential object.

Real-time object detection within a live view captured by an image sensor of mobile computing device may be executed, 120. As described above, object segments extracted from the 3D point cloud data form a rough 3D model of the pre-stored image data. These object segments from the 3D model may be used to identify the object within the captured live view. In one embodiment, related data such as data identifying the location of the mobile computing device may also be used to help identify the object. A mobile computing device may utilize system components and applications (e.g., the Global Positioning System (GPS) sensors, cellular or WiFi network connections, orientation sensors) to narrow down the device's location.

The position and orientation of the image sensor of the mobile computing device, with respect to the object, is determined, 130. Said position and orientation may be determined based on the captured live view of the object—i.e., by identifying which object segments are visible in the live view and matching those object segments to the 3D model of the object, it can be determined where the image sensor of the mobile computing device is positioned with respect to the object. Returning to the example of viewing a cube-shaped object, if only a north-facing side of the cube-shaped object is visible in the live view, it can be determined that the image sensor is positioned north of the cube-shaped object, and close-enough in proximity to the object such that only one side of the object is visible in the live view. In one embodiment, the associated location data described above is also used to help determine the position and view angle of the image sensor.

A projection mask for a point of interest included in the object is generated from the 3D model of the object, 140. A point of interest may be identified, for example, by name, by category, by subject matter, etc. As described above, a particular challenge in augmenting an object to highlight a point of interest is when the object also includes other potential points of interest. Thus, multiple potential points of interest will be included within the same 3D model of the object, and may also be included within the same 3D segment of the 3D model or even within the same 2D plane of the 3D model.

In one embodiment, the location and orientation information of the image sensor, along with related pre-stored image data of the approximate location of the point of interest whose views are close to the approximate view (e.g., reference models), may be utilized to extract visual features of the object. These visual features are mapped to the appropriate segments of the 3D model, and projection masks for the point of interest in the 3D model of the object are formed. Thus, each projection mask will include a subset of segments of the 3D model, or in some scenarios, a portion of a segment of the 3D model as described below.

The live view is then augmented with image data, such that the image data is included in the projection mask and is displayed three-dimensionally consistent with the position and the orientation of the image sensor, 150. Thus, augmentation applications or modules may project data within the generated projection mask that is relevant to the point or object of interest. In other words, the user may take an image with the mobile computing device and register it in the correct perspective in the 3D model. The image or live view may be augmented in real time with additional information, such as text, images or videos, or some 3D structure, added in the correct perspective.

Mobile client platforms that execute the above described embodiment process may include cameras, location and orientation sensors, and wireless communication capabilities. In one embodiment a mobile client device accesses processed data from a server through a network in real-time; if the user cannot connect to a network due to costs or other reasons, a small database can be pre-loaded on the mobile client device.

Thus, embodiments of the invention may execute off-line database processing, on-line object detection and mobile computing device tracking, and combine the off-line and on-line data into a meaningful augmented user display.

Figure 2:
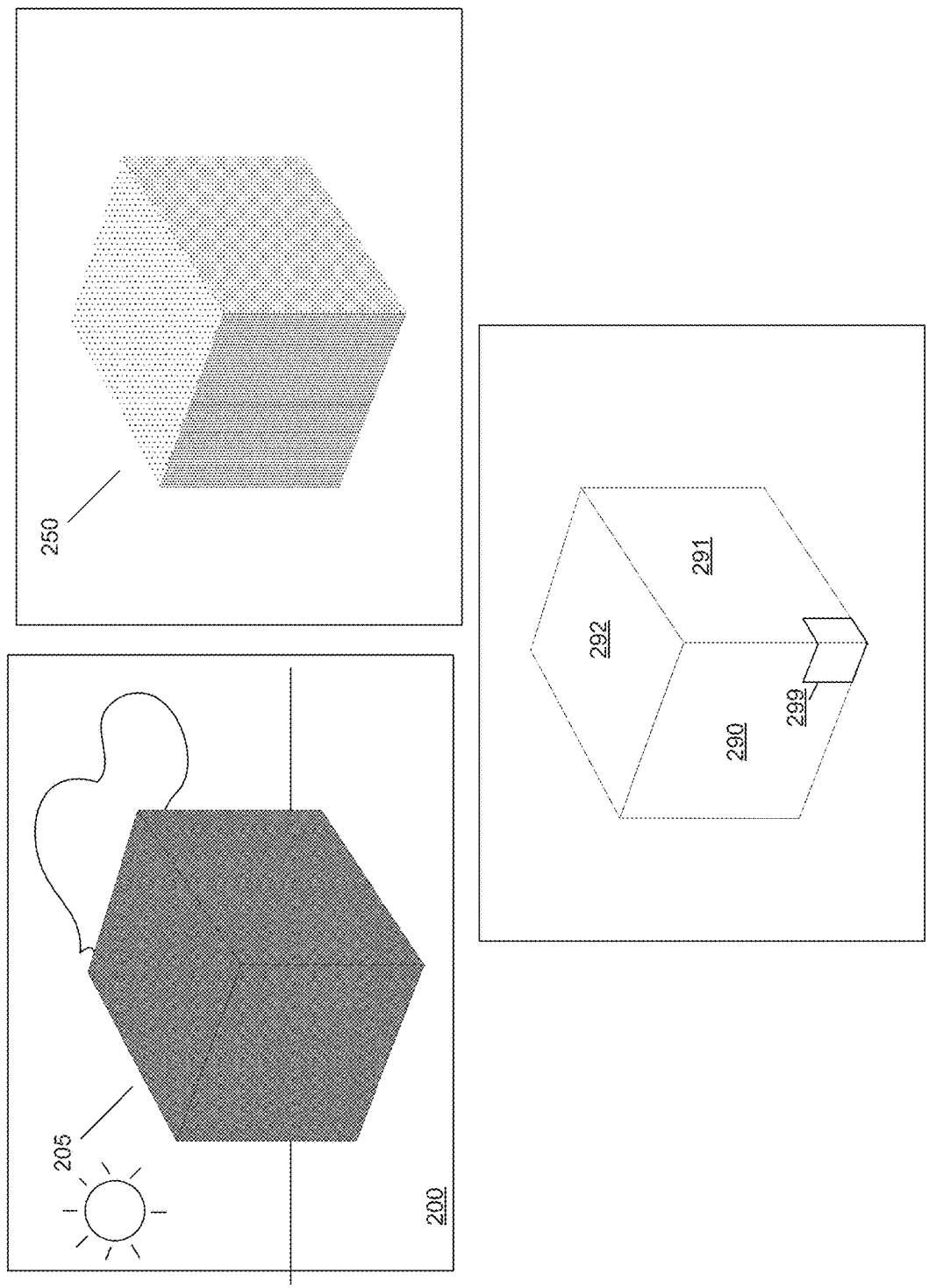
FIG. 2 is a diagram of a 3D model used to augment image data according to an embodiment of the invention.

FIG. 2 is a diagram of a 3D model used to augment image data according to an embodiment of the invention. FIG. 2 illustrates image data, 3D point cloud data and projection masks that may be processed by embodiments of the invention. 3D point cloud 250 corresponds to pre-stored 3D image 200 of object 205. Each 3D point in cloud 250 represents the actual 3D location of a pixel of image 200. Some pixels in image 200 may not have a corresponding 3D point, e.g., pixels in the sky.

In some embodiments 3D point cloud data 250 is transformed into a coordinate system more suitable for subsequent processing. For example, if 3D point cloud data 250 is in the format of "latitude, longitude, and altitude," it may be more useful to transform the format to a local coordinate system such as east, north, and up (ENU), so the values of the coordinates are smaller (i.e., compared to coordinates in a system with the center of the earth as the origin). This transformation may also better convey the vertical and horizontal orientations of 3D point cloud data 250.

In some embodiments, 3D point cloud data 250 results from a larger set of 3D point cloud data sub-sampled to make computation faster. This may be accomplished by downsampling the pre-stored image or the corresponding 3D point cloud. For example, for a 200×500 image, the size of the corresponding 3D point cloud data may consist of up to 150,000 points. By sampling the image at a rate 10 in both horizontal and vertical dimensions, the number of 3D points may be reduced to 1,500 points.

In order to determine the contours of object 205 from 3D point cloud data 250, embodiments of the invention may adopt a random sample consensus (RANSAC) approach and combine both pre-stored image 200 and 3D point cloud data 250 to guide the sampling process in RANSAC rather than arbitrarily sampling the 3D point cloud data. In this example, because object 205 is cube shaped, its 3D model is made from a limited number of 2D planes, including 2D planar segments 290, 291 and 292.

For the example use of identifying a user identified point of interest in object 205, it may be determined which of 2D planar segments include said point of interest. In this example, the user identified point of interest is visible in 2D planar segments 290 and 291. Other information of the user selected point of interest is processed to determine its boundaries in order to generate projection mask 299 as shown.

Figure 3:
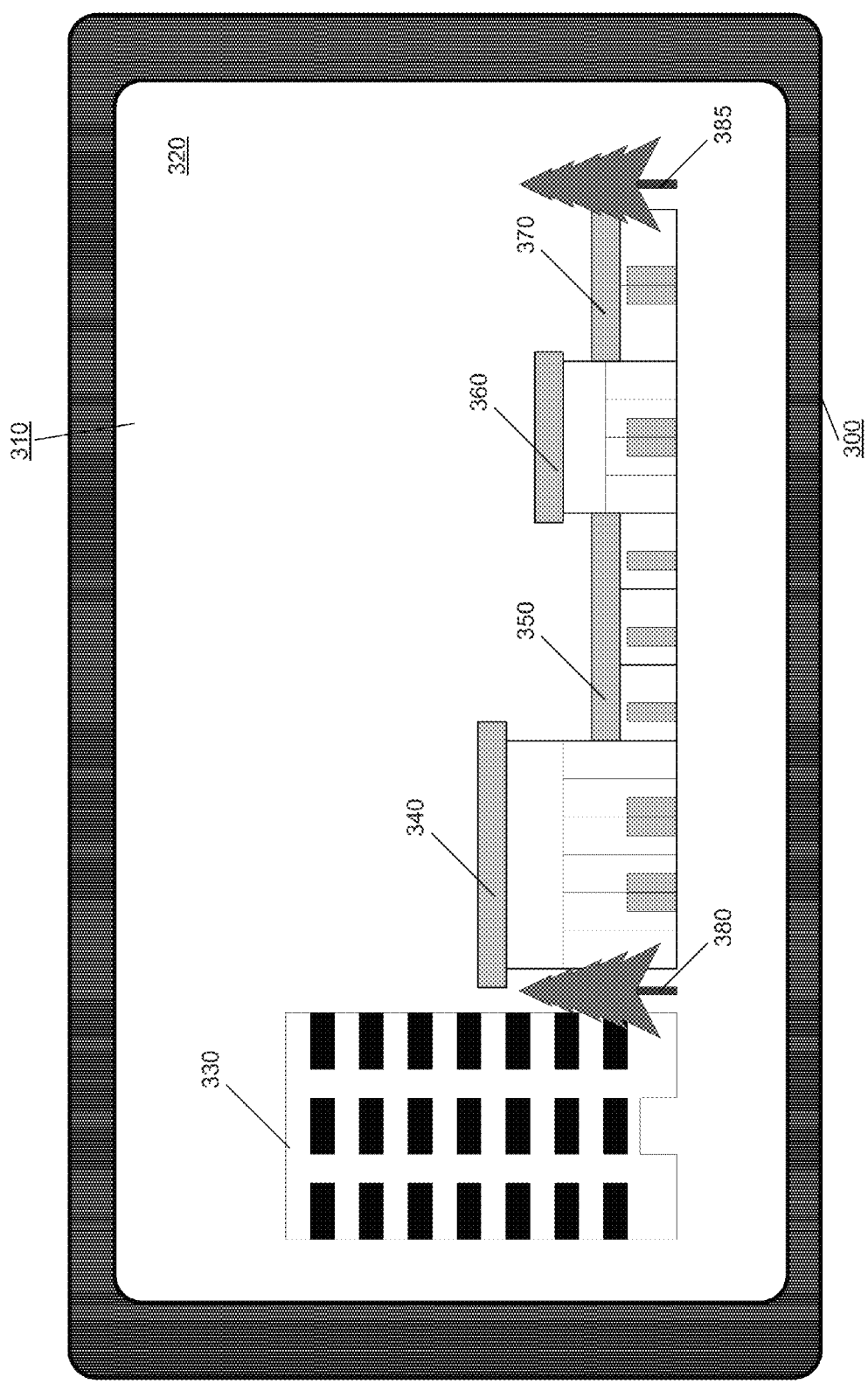
FIG. 3 is a live view scene to be augmented according to an embodiment of the invention.

FIG. 3 is a live view scene to be augmented according to an embodiment of the invention. In this example, display 310 includes real-time view 320 of a user's surroundings via an image sensor (e.g., a camera) included in mobile computing device 300. Said device may be any portable computing system, such as a laptop computer, a tablet computer, a smartphone, a hand-held computing device, a vehicle computing system, etc.

It is to be understood that by displaying real-time view 320, display 310 may function as a viewfinder displaying image data (e.g., pictures, video) to allow a user to observe the target of the image sensor of device 300. In this example, real-time view 320 includes a view of buildings 330, 340, 350, 360 and 370, wherein some of the views of the buildings are partially obstructed by trees 380 and 385.

Embodiments of the invention may process available 3D models and potential augmenting information for use on mobile device 300 in real-time. For example, embodiments of the invention may merge street addresses, 3D models, 3D point-clouds, depth images, and radiometric (color) images to determine the true extent of potential points of interest within each building. Because some embodiments preprocess this information offline, there are no strict time, computational complexity or storage constraints (i.e., it is understood that building detection is a computationally expensive operation and cannot typically be performed at video frame rates).

Furthermore, the above described processing enables device 300 to detect (i.e., recognize) and track the buildings in view 320, and estimate the position and orientation of the image sensor of device 300 relative to the buildings. In one embodiment, GPS, or other location services such as WiFi and 3G, coupled with orientation sensors (e.g., a compass, an accelerometer) are used to find the image sensors location and orientation. It is to be understood that this sensor information may simplify building detection because the system need only match against database images that fulfill location and orientation constraints. To perform building detection, visual features from input video frames on device 300 may be extracted and compared to pre-processed visual features from candidate database images.

Because building detection and device tracking processes may take different lengths of time to compute, embodiments of the invention may use a multi-threaded framework to coordinate these tasks. For example, a tracking thread for determining the location and orientation of device 300 may be done in real-time, while a building detection thread may be done without a hard time-constraint. Said multi-threaded framework may also coordinate the outputs from the building detection thread and the tracking thread. In one embodiment, a confidence measure is utilized to check the reliability of output from building detection processes, and when new results are available, display 310 is updated if they are more confident than prior results. The output from the building detection thread is used to update the determined pose of device 300 if the confidence value is larger than the aged confidence value from the tracking thread.

Thus, prior to augmenting live view 320, embodiments of the invention may execute the building detection and device tracking processes described above. The processing may take place on the mobile computing device, on another computing device or server operatively coupled to the mobile computing device, or any combination thereof. Similarly, the data used in the building detection and device tracking processes may be included on the mobile computing device, on another computing device or server operatively coupled to the mobile computing device, or any combination thereof.

In this example, the position of device 300 is such that only the front façade of buildings 330-370 are in view 320. As described above, a particular set of challenges arises in outdoor building recognition and augmentation when a user identified point of interest is a business included in a building with other unselected businesses. In this example, buildings 330 and 350 each include a plurality of businesses; thus merely identifying said buildings and extracting projection masks related to the front façade of each building is insufficient to convey meaningful augmented content to the user. For these reasons the system must be aware of the each building's 3D geometry, as well as its latitude and longitude. When the scene is augmented, the labels must be meaningfully related to the individual store-fronts. Thus, embodiments of the invention may further process related data to enable localizing augmented content to the relevant storefront, and generate projection masks such that the augmented content appears in the appropriate section of the building façade. In one embodiment, the augmented content is to be located at or near the center of the store-front, and the extent of the generated projection mask will be the same as that of the storefront. To present this type of experience to the user, embodiments of the invention may semantically segment buildings when appropriate.

Figure 4:
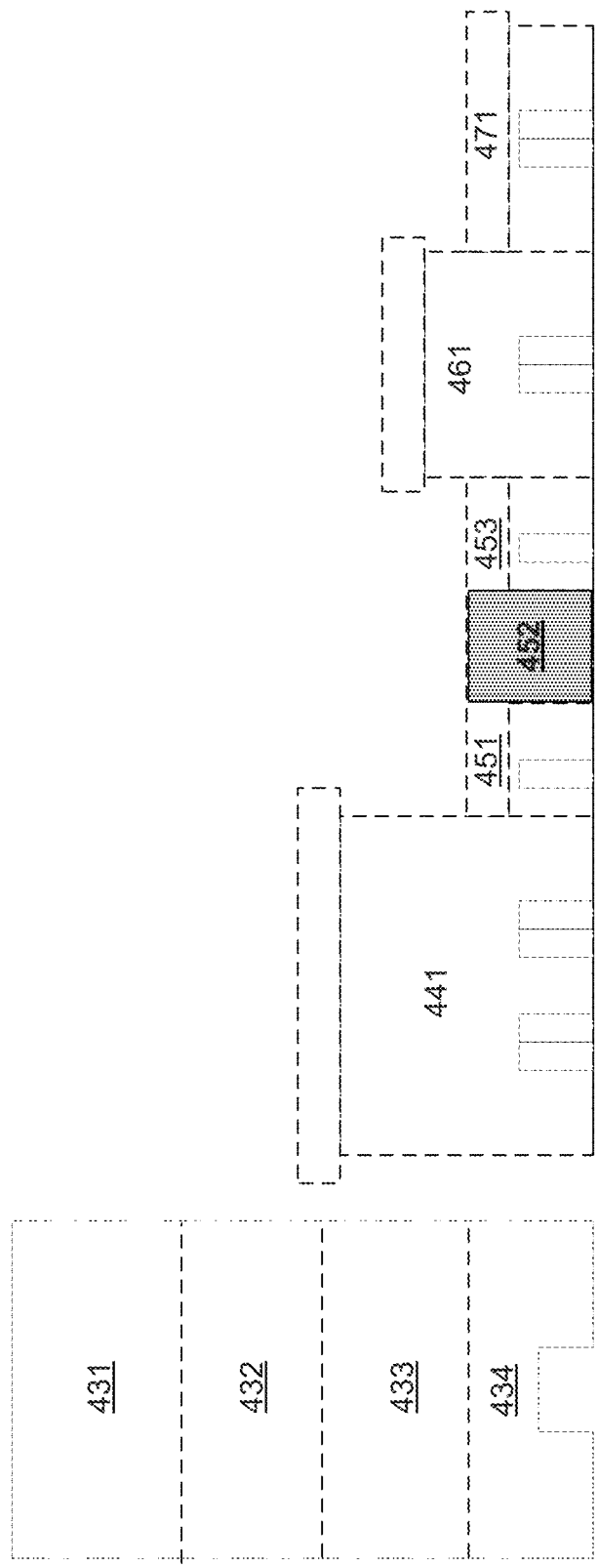
FIG. 4 is an illustration of a plurality of projections masks generated based on 3D cloud data according to an embodiment of the invention.

FIG. 4 is an illustration of a plurality of projections masks generated based on 3D cloud data according to an embodiment of the invention. The projection masks illustrated are extracted from 3D information related to view 320 through processes described above. In this example, given the shape of the buildings and their perspective within view 310, said projection masks are shown to be 2D planar segments included in the front façade of each building.

Building 330 includes four different potential points of interest (e.g., four different businesses) and is represented by projection masks 431, 432, 433 and 434. Building 350 includes three different potential points of interest, and is represented by projection masks 451, 452 and 453. Buildings 340, 360 and 370 each only contain one potential point of interest, and thus each is represented by single projection masks 441, 461 and 471 respectively.

Each of the above described projection masks is geometrically consistent with a surface plane of their respective buildings as they appear in view 320. For buildings 330 and 350, which include multiple potential points of interest, embodiments of the invention may process location information, building geometry, and visual imagery to generate the appropriate projection masks.

In one embodiment, the center of the store-front in the building's 3D model is estimated. This center may be estimated with the assistance of, for example, each business's known street address, which can give an ordering and approximate location of each store-front relative to the street block. This coarse estimate can then be projected onto the 3D model, where geometric constraints are enforced. Such constraints may include minimum and maximum widths for store-fronts, or positions relative to distinct planes on the façade.

In one embodiment, processed data includes a collection of street-level spherical panorama images at known dense GPS locations. These images processed together with the 3D information in the form of depth data and sequence of projection masks will approximate the structure of the urban scene included in view 320. As described above, in some embodiments preprocessing is necessary to make such data usable for processing on the mobile device (e.g., detection, tracking, and augmentation). These panoramas are processed by projecting them on to the above described planes at fixed orientations relative to the device including display 310. It is to be understood that such projected 2D images may be suitable to be used as reference images for visual matching on a mobile device when they have similar geometry to query images from the mobile device.

In one embodiment, further estimating the true extent of the individual store-fronts within each building is done using the above described collection of street-level spherical panorama images. Each store-front is represented in multiple views in the database, from which a fine-scale depth is reconstructed. This color and depth data may then be composed with the 3D model, and each store-front's extent can be grown from the central point until a natural color and/or depth boundary is reached.

Embodiments of the invention may further use the location information, for example, the GPS coordinates of the centers of the projection masks, to perform geocoding (adding a coordinate to a planar image segment), or inverse geocoding (looking up existing information for a given location). Inverse geocoding can be used as one source of the augmenting information for real-time device operation. Once a geocoding system is in place, it may be deployed as a service to geotag legacy image and video content for the user for subsequent use.

Estimating the extent of a store-front can be further aided by the inclusion of more data provided by the business owner, or device user. In the case of the device user, embodiments of the invention may provide a simple editing method for manipulating the augmentation. This may be a simple polygon, whose corners the user is allowed to move. This will allow a user to input a correct, but slightly misaligned result to quickly update the service. These updates are then aggregated and compared against each other and the other known data so that the next user will get an improved service. In one embodiment, because it is assumed a store owner is a more motivated and trusted contributor of accurate data about the store, data from the business owner may be given a higher priority in the aggregation scheme.

Figure 5:
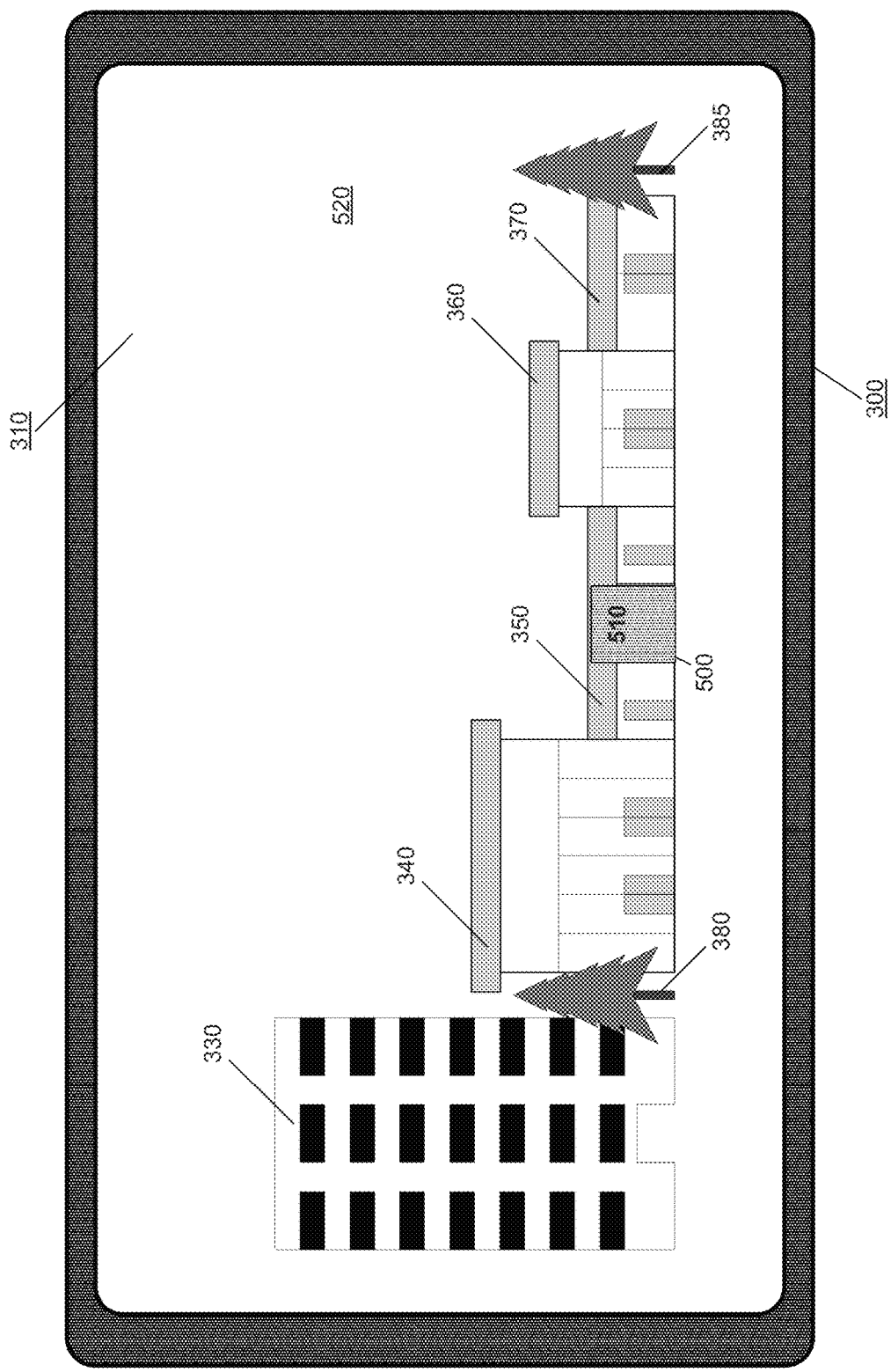
FIG. 5 is an illustration of an augmented live view according to an embodiment of the invention.

FIG. 5 is an illustration of an augmented live view according to an embodiment of the invention. In this embodiment, augmented content window 500 identifies the appropriate point of interest in building 350 and displays image data 510 related to the point of interest in real-time view 520. Image data 510 is displayed geometrically consistent with its respective projection mask (i.e., geometrically consistent with 2D plane 452 of FIG. 4).

Image data 510 may include an image related to the point of interest, for example an image identifying the boundaries of the point of interest, video content related to the point of interest (e.g., a video advertisement), 3D animated object (e.g., 3D animated advertisement), or text data related to the point of interest. Said image data may be included in memory storage of device 300, or obtained from a database via a network connection (e.g., wireless internet connection).

Figure 6B:
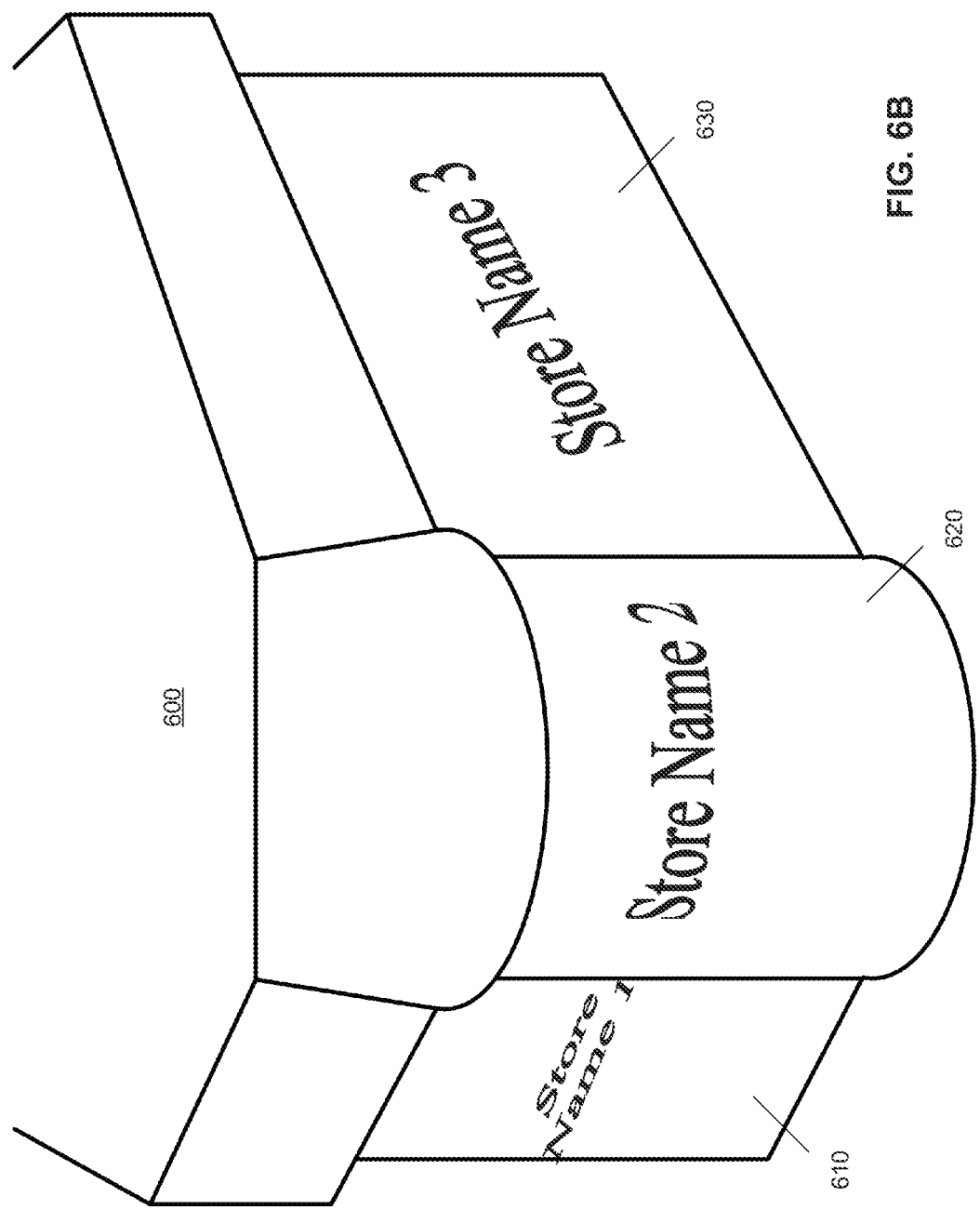

FIGS. 6A and 6B illustrate projection masks and an augmented live view for multiple points of interest according to an embodiment of the invention. In this embodiment, the captured view of building 600 includes two façade segments 610 and 630 that, from the perspective of the image sensor, are relatively planar, and contoured façade segment 620. Thus, embodiments of the invention may utilize 2D planar segments and 3D contoured/spherical masks to provide the system with a coarse estimate of the extent of the façade of building 600.

Thus, it is to be understood that projected masks 610-630 may be used to represent the surface contours of the relevant portions of an object. Contoured projection mask 620 may be used for augmentation content later in real-time processing, wherein the augmentation content will be projected consistent with the contour of mask 620 (as well as consistent with the orientation of the host mobile device with respect to building 600). Additionally, contour information may be used in combination with edge detection to improve object detection to identify building 600.

Thus, multiple points of interest may be identified. Related image data corresponding to the points of interest (e.g., an icon, text data, video, 3D animated object, or image data as described above) may be displayed. In this example, text data identifying the name of each business in building 600 is displayed as shown in FIG. 6B. The text data is both centered within the boundaries of each respective business, and displayed based on the relevant projected mask.

Figure 7:
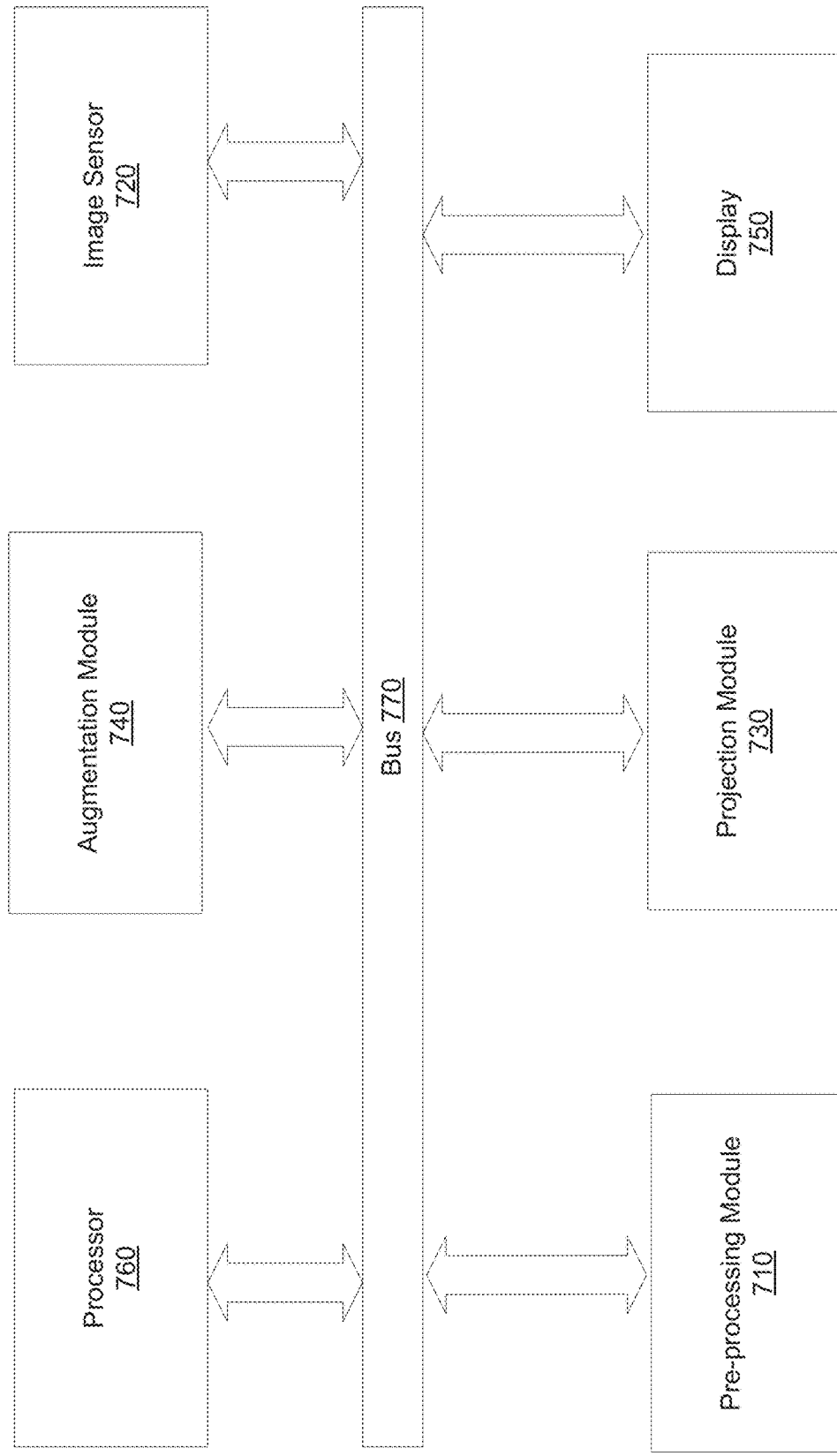
FIG. 7 is a block diagram of a system that may utilize an embodiment of the invention.

FIG. 7 is a block diagram of a system that may utilize an embodiment of the invention. System 700 may include pre-processing module 710 to execute the operations involving pre-stored images and 3D point cloud data to generate 3D models of objects as described above. System 700 may further include image sensor 720 to capture image data as described above.

Projection module 730 may process 3D data and location data of an object to generate a projection mask, as described above. Augmentation module 740 may augment the captured image data with associated content within the projection mask as described above. The augmented image data may be displayed on display 750.

In this embodiment, modules 710, 730 and 740 are executed via processor 760. All components of system 700 described above may be operatively coupled via bus 770. It is to be understood that the various modules described in FIG. 7 may all be included in a mobile computing device, or separately in various locations (i.e., any or all of the modules in FIG. 7 may be included in a server interfaced with a mobile computer device to provide "backend processing"). Furthermore, it is to be understood the operations related to the described modules are an example embodiment only, and that any operations described above may be executed via multiple devices operatively coupled together.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein. A computer readable storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A method comprising:
   detecting an object in a live view image captured by an image sensor;
   generating a three-dimensional (3D) model generated for the object;
   determining a position and orientation of the image sensor by identifying segments of the object in the live view image;
   extracting visual features of the object using the position and orientation of the image sensor;
   generating a first two-dimensional (2D) projection mask corresponding to a first user selected point of interest (POI) included in the 3D model;
   generating a second 2D projection mask corresponding to a second user selected point POI included in the 3D model; and
   augmenting the live view image with the extracted visual features of the object and the first and second projection masks to display the first and second POIs within the object.

2. The method of claim 1, further comprising processing a database of 3D cloud data for the object.

3. The method of claim 2, wherein processing the 3D cloud data comprises extracting the 2D planar segments from the 3D cloud data.

4. The method of claim 3, wherein processing the 3D cloud data further comprises:
   combining sets of point cloud data; and
   associating the point cloud data with location data.

5. The method of claim 4, wherein processing the 3D cloud data further comprises processing 2D images of the object from multiple angles with corresponding point cloud data sets from multiple angles and view positions.

6. The method of claim 5, further comprising receiving information regarding the reliability of the 3D cloud data.

7. The method of claim 1, wherein determining the position and orientation of the image sensor further comprises:
   matching the visible object segments with object segments of the 3D model.

8. The method of claim 1, wherein each of the one or more projection masks are geometrically consistent with a surface plane of the object.

9. The method of claim 1, wherein the object comprises a building and the detected surface of the structure comprises an external side of the building.

10. An apparatus comprising:
    a processor;
    a memory; and
    an augmentation module included in the memory and executed via the processor to:
       detect an object in a live view image captured by an image sensor;
       generate a three-dimensional (3D) model generated for the object;
       determine a position and orientation of the image sensor by identifying segments of the object in the live view image;
       extract visual features of the object using the position and orientation of the image sensor;
       generate a first two-dimensional (2D) projection mask corresponding to a first user selected point of interest (POI) included in the 3D model;
       generate a second 2D projection mask corresponding to a second user selected point POI included in the 3D model; and
       augment the live view image with the extracted visual features of the object and the first and second projection masks to display the first and second POIs within the object.

11. The apparatus of claim 10, further wherein the augmentation module processes a database of 3D cloud data for the object.

12. The method of claim 11, wherein processing the 3D cloud data comprises extracting the 2D planar segments from the 3D cloud data.

13. The method of claim 12, wherein processing the 3D cloud data further comprises:
    combining sets of point cloud data; and
    associating the point cloud data with location data.

14. The method of claim 13, wherein processing the 3D cloud data further comprises processing 2D images of the object from multiple angles with corresponding point cloud data sets from multiple angles and view positions.

15. The method of claim 14, further comprising receiving information regarding the reliability of the 3D cloud data.

16. The method of claim 10, wherein determining the position and orientation of the image sensor comprises:
   identifying visible object segments in the live view image; and
   matching the visible object segments with object segments of the 3D model.

17. The method of claim 10, wherein each of the one or more projection masks are geometrically consistent with a surface plane of the object.

18. The apparatus of claim 10, wherein the object comprises a building and the detected surface of the structure comprises an external side of the building.

19. The apparatus of claim 10, wherein the apparatus comprises a mobile computing device, the mobile computing device to further include a display to display an augmented live view including the image data associated with the POI.

20. An article of manufacture comprising a non-transitory machine-readable storage medium that provides instructions that, if executed by the machine, will cause the machine to perform operations comprising:
   detecting an object in a live view image captured by an image sensor;
   generating a three-dimensional (3D) model generated for the object;
   determining a position and orientation of the image sensor by identifying segments of the object in the live view image;
   extracting visual features of the object using the position and orientation of the image sensor;
   generating a first two-dimensional (2D) projection mask corresponding to a first user selected point of interest (POI) included in the 3D model;
   generating a second 2D projection mask corresponding to a second user selected point POI included in the 3D model; and
   augmenting the live view image with the extracted visual features of the object and the first and second projection masks to display the first and second POIs within the object.

21. The article of manufacture of claim 20, further comprising processing a database of 3D cloud data for the object.

22. The article of manufacture of claim 21, wherein processing the 3D cloud data comprises extracting the 2D planar segments from the 3D cloud data.

23. The article of manufacture of claim 22, wherein processing the 3D cloud data further comprises:
   combining sets of point cloud data; and
   associating the point cloud data with location data.

24. The article of manufacture of claim 23, wherein processing the 3D cloud data further comprises processing 2D images of the object from multiple angles with corresponding point cloud data sets from multiple angles and view positions.

25. The article of manufacture of claim 24, further comprising receiving information regarding the reliability of the 3D cloud data.

26. The article of manufacture of claim 20, wherein determining the position and orientation of the image sensor comprises:
   matching the visible object segments with object segments of the 3D model.

* * * * *